United States Patent
Shiratori et al.

(10) Patent No.: US 6,212,513 B1
(45) Date of Patent: Apr. 3, 2001

(54) DATABASE ACCESS SYSTEM

(75) Inventors: Takaaki Shiratori, Machida; Akio Kido, Tokyo; Shigeru Tachikawa, Kokobunji; Tsuneo Mochizuki, Kanagawa-ken, all of (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/103,410

(22) Filed: Jun. 24, 1998

(30) Foreign Application Priority Data

Jun. 27, 1997 (JP) .................................... 9-171783

(51) Int. Cl.[7] ................................................. G06F 17/30
(52) U.S. Cl. ........................................ 707/2; 707/3; 707/4
(58) Field of Search ...................... 707/2, 3, 4; 709/201

(56) References Cited

U.S. PATENT DOCUMENTS

| | | | |
|---|---|---|---|
| 4,949,255 | * | 8/1990 | Gerth et al. .......................... 709/315 |
| 5,724,570 | * | 3/1998 | Zeller et al. ............................. 707/3 |
| 5,893,104 | * | 4/1999 | Srinivasan et al. ................... 707/102 |
| 5,918,225 | * | 6/1999 | White et al. ............................ 707/3 |
| 5,924,089 | * | 7/1999 | Mocek et al. .......................... 707/4 |
| 5,950,188 | * | 9/1999 | Wildermuth ............................ 707/3 |
| 5,987,463 | * | 11/1999 | Draaijer et al. ....................... 707/10 |

* cited by examiner

Primary Examiner—John Breene
Assistant Examiner—Cheryl Lewis
(74) Attorney, Agent, or Firm—Ohlandt, Greeley, Ruggiero & Perle, L.L.P.

(57) ABSTRACT

The invention enables transformation of an SQL statement of CHAR type to another SQL statement of another data type adequate for a database that is defined by a character string type other than CHAR type, thereby enabling to access the database using an SQL statement of CHAR type. At a call level interface (CLI driver), a literal such as a condition clause of an SQL SELECT statement that is included in an application program, a column value of an UPDATE statement or the like is passed to a function of the call level interface as a parameter. The call level interface examines a character type and a character code included in the passed literal, selects the most probable one of character string data types of a database to be accessed, modifies its access syntax in line with the selected data type and attempts to access the database. Accessing of the database is attempted while sequentially modifying the access syntax in the order of probability.

14 Claims, 7 Drawing Sheets

NOTE: EACH OF 'D1', 'D2' STANDS
FOR A DOUBLE-BYTE CHARACTER

FIG.3(a)

NOTE: EACH OF 'D1', 'D2' STANDS
FOR A DOUBLE-BYTE CHARACTER

DATABASE ACCESS SYSTEM

FIELD OF THE INVENTION

This invention relates to a database access system and, more particularly, to a database that is capable of accessing an SQL database engine via CLI (Call Level Interface).

BACKGROUND OF THE INVENTION

In a prior database system that is accessible using a database access statement of SQL (Structured Query Language) or the like, an application program has had access thereto via middleware such as CLI or the like. One example of such middleware is ODEC (Open Database Connectivity) of the Microsoft Corp.

Figure 1:
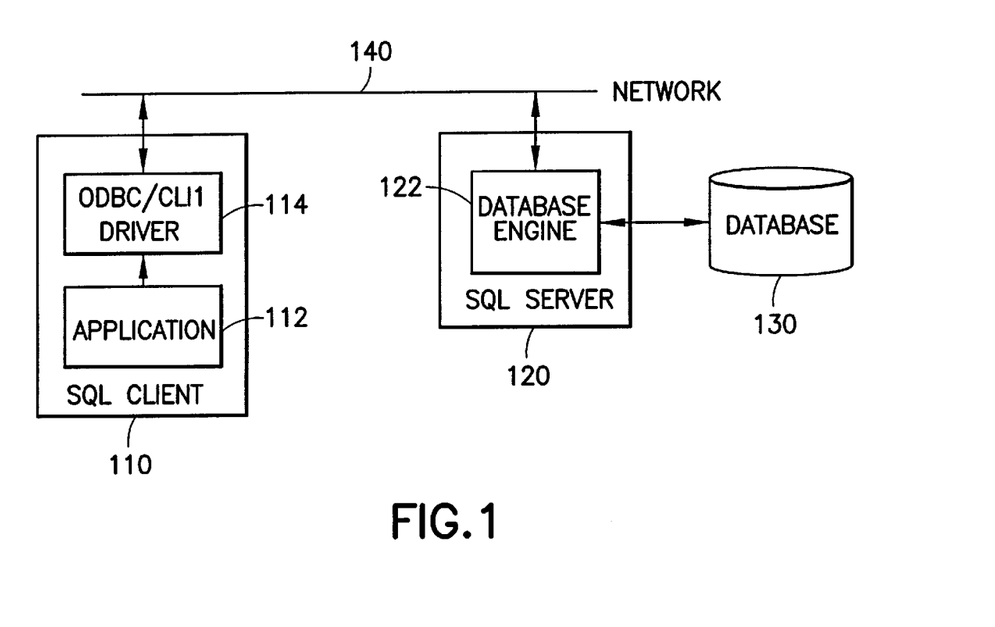
FIG. 1 is a block diagram illustrating an exemplary configuration of a server/client system for a database using SQL.
Figure 2:
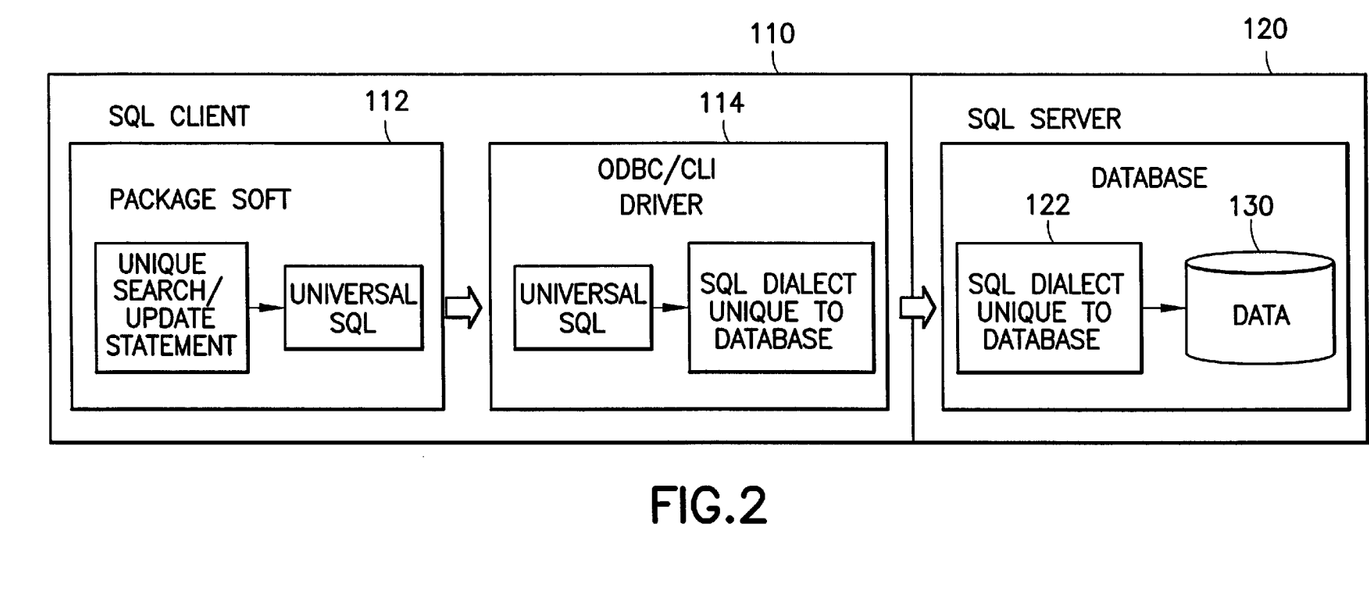
FIG. 2 is a functional block diagram illustrating roles of a call level interface (CLI).

FIGS. 1 and 2 illustrate a configuration for implementing CLI in a database that may use an SQL database access statement. More particularly, FIG. 1 illustrates a system of the client/server type, which implements the aforesaid CLI. In case of accessing an SQL server 120 from an application 112 on an SQL client 110, an SQL instruction embedded within application 112 is sent to the SQL server 120 via an ODBC/CLI driver 114. A database engine 122 on SQL server 120 executes the received SQL instruction to process data 130 and to return the processed result to application 112 via the ODBC/CLI driver 114.

This is illustrated in FIG. 2 in more detail. In FIG. 2, a search statement or an SQL update statement, pursuant to the protocol of ODEC/CLI and embedded in a unique language of the package software (application software) 112, is rendered to be a universal SQL statement, which is then passed to the ODEC/CLI driver 114. In this ODEC/CLI driver 114, such a statement is transformed to an SQL dialect that is unique to a database to be accessed, which is then sent to SQL server 120. Using this SQL dialect, database engine 122 on database server 120 processes data 130.

Heretofore, an attempt has been made to extend an SQL database of the type that supports data comprising single byte characters (single byte character set: SBCS) alone, thereby enabling to support data comprising double byte characters (double byte character set: DBCS) such as Kanji or the like. For example, in the SQL defined by Japanese Industrial Standards (JIS), whenever DBCS data representing Kanji or the like is to be accessed, syntax different from that of SBCS is introduced. This is illustrated in FIGS. 3a and 3b.

Figure 3A:
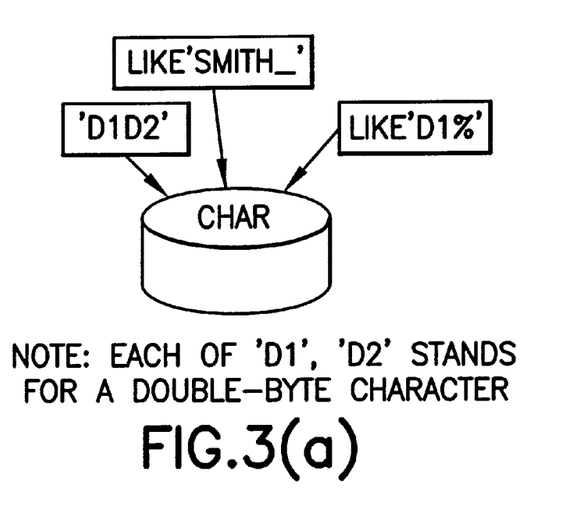
FIGS. 3a and 3b are diagrams illustrating access to databases of CHAR type and NCHAR type.
Figure 3B:
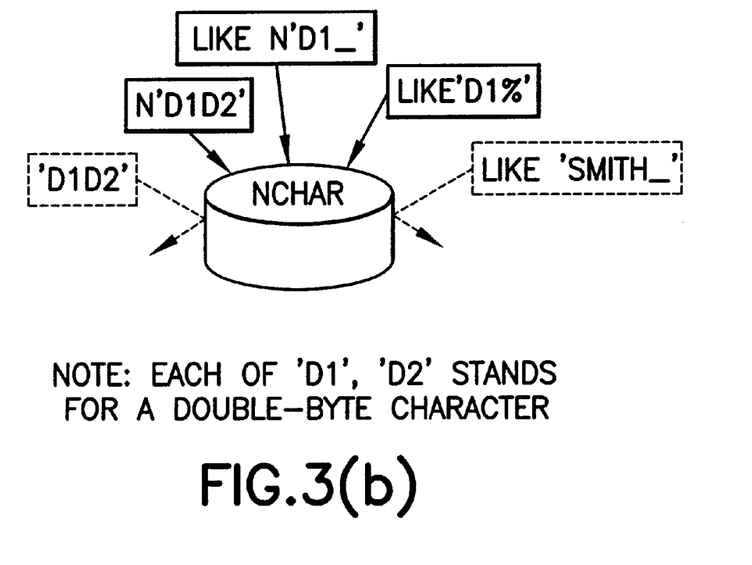

In a database shown in FIG. 3a, double byte data such as "D1D2" (where each of "D1" and "D2" stand for a double byte character) or the like is stored as single byte data. In such a case, all data is accessed with the syntax of CHAR type. FIG. 3b shows that if the database shown in FIG. 3a is enhanced to support NATIONAL CHARACTER (NCHAR) or migrated to a new database which supports NATIONAL CHARACTER (NCHAR), it will be necessary to add "N" indicating NCHAR before literal of the data for accessing the corresponding data item. In another words, any syntax that is not provided with such "N" will result in an error.

However, in the conventional CLI, CHAR type has been defined as a sole data type. Namely, it has not been possible to specify NCHAR type and, thus, there has been no way to access any database having data of NCHAR type.

PROBLEMS TO BE SOLVED BY THE INVENTION

It is an object of this invention to transform, at a call device interface, an SQL statement of CHAR type to another SQL statement of another data type adequate for a database that is defined by a character string type other than CHAR type (a character string data type that is independently extended by a user, a character string type that requires syntax different from that of the standard character string type for accessing, or the like), whereby the database may be accessed using an SQL statement of CHAR type.

SUMMARY OF THE INVENTION

In order to accomplish the object, this invention is directed to a database access system for interfacing database access from an application, which comprises means for examining the literal of a database access statement passed thereto; means for transforming the database access statement to another database access statement adequate for the literal; and means for accessing a database using the another database access statement.

If the accessed result is erroneous, the transforming means transforms the another database access statement again to yet another database access statement adequate for the literal, thereby to access the database.

The transforming means repeats the transformation until transformation candidates are exhausted or a specified number of transformation candidates are transformed. Additionally, the database access system comprises transformation storage means for storing transformed information for each column, whereby the transforming means may perform the first transformation based on the information stored in the transformation storage means.

Further, this invention is directed to a recording medium for storing a program adapted for implementing functions of an interface in the database access system.

With such arrangement, there is no need to change an application or database even in a situation where a database system is extended to increase the number of data types to be accessed.

DESCRIPTION OF SYMBOLS

110 SQL Client
112 Application
114 ODEC/CLI Driver
120 SQL Server
122 Database Engine
130 Data
140 Network
152 SQL Statement Transforming Section 154 Transformed Information Storage Section
156 Error Detection Section
158 Dynamic SQL Request Execution Section

DETAILED DESCRIPTION OF THE PREFERRED EMBODIMENT

Now, with reference to the accompanied drawings, an embodiment of this invention will be described in detail.

At a call level interface (CLI driver), a literal such as a condition clause of an SQL SELECT statement included in an application program, a column value of an UPDATE statement or the like is passed as a parameter to a function of the call level interface. The call level interface of this invention examines a character type and a character code included in the passed literal, selects the most probable one of character string data types of a database to be accessed, modifies its access syntax in line with the selected data type, and attempts to access the database. In this way, accessing of the database is attempted while sequentially modifying the access syntax in an order of probability.

Figure 4:
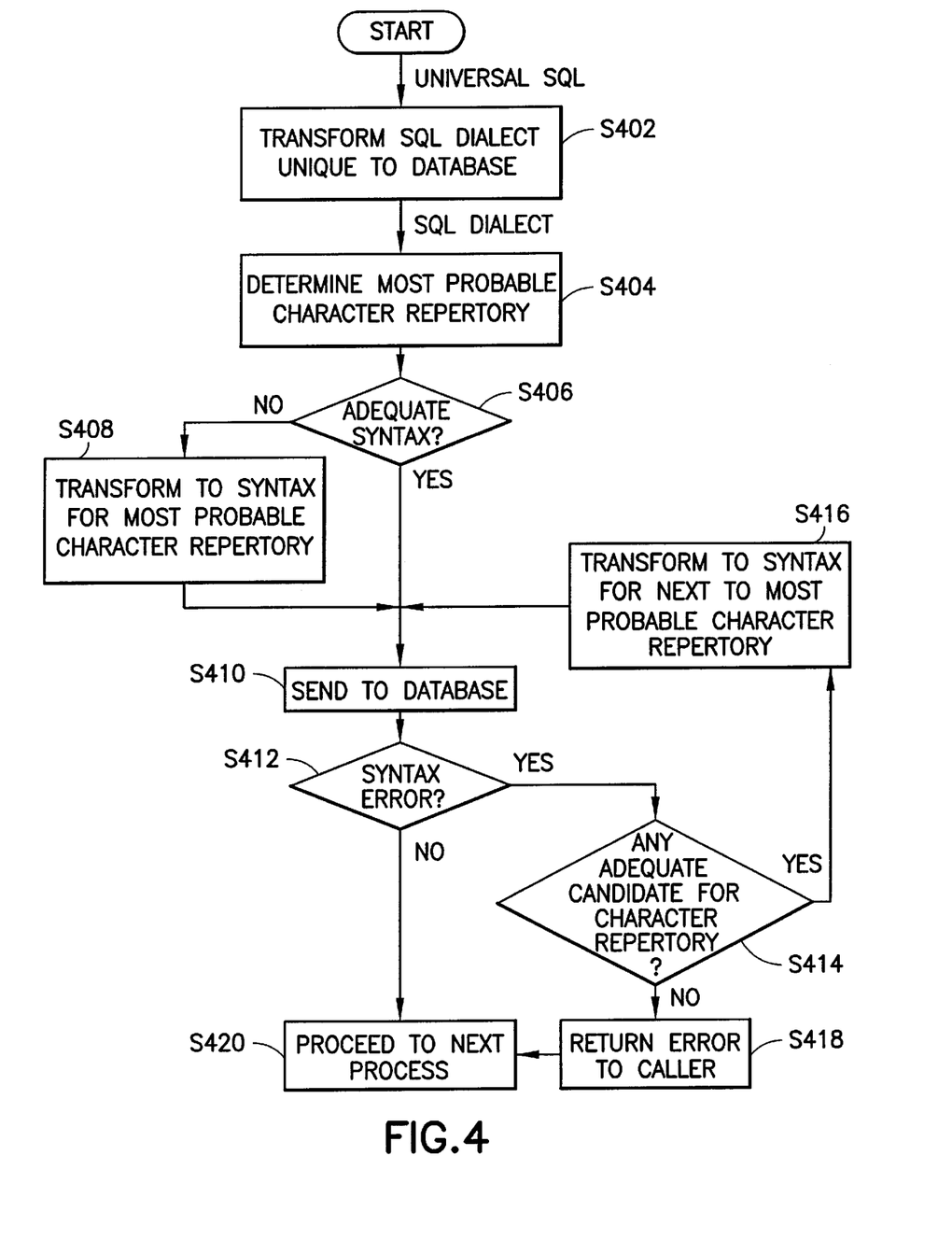
FIG. 4 is a flow chart illustrating a process for syntax transformation.

FIG. 4 is a flow chart showing an example of a process to be performed at the call level interface (CLI driver). In FIG. 4, when an SQL statement (a universal SQL statement) from an application program is entered into the CLI driver of this invention, it is transformed to an SQL statement unique to the database (S402). In accordance with this invention, the character literal in the transformed SQL statement is checked to determine the most probable one of character repertories (character sets) from its code or the like (S404). Then, a check is made to see if the syntax is adequate for this character repertory (S406). If not, the syntax is transformed to another syntax associated with this character repertory (S408). For example, in a case where Kanji data to be accessed is represented by the shift-JIS code, by means of examining a range of the code indicated in the first byte of its double byte, it is possible to determine if this is the double byte code (Kanji code) or the single byte code. And, in the former case where all data to be accessed is represented by the double byte code, it is, for example, possible to transform the syntax of SQL by adding "N" before the literal pursuant to the JIS SQL. Then, this SQL statement is sent to an engine of the database (S410). If the database is accessible by this syntax (NO branch of S412), this process will proceed to next one (S420).

If a syntax error is returned from the database engine (YES branch of S412), determination of character repertory is performed again at the CLI (S414). If there still exists a candidate to be transformed, its syntax transformation is performed (S416), and the database is accessed (S410). If all candidates are exhausted, the CLI returns an error to CALLER or the application program (S418). While in the present example, such syntax transformation is performed until all candidates are exhausted, it may be done until a specified number of transformations are carried out.

Figure 5:
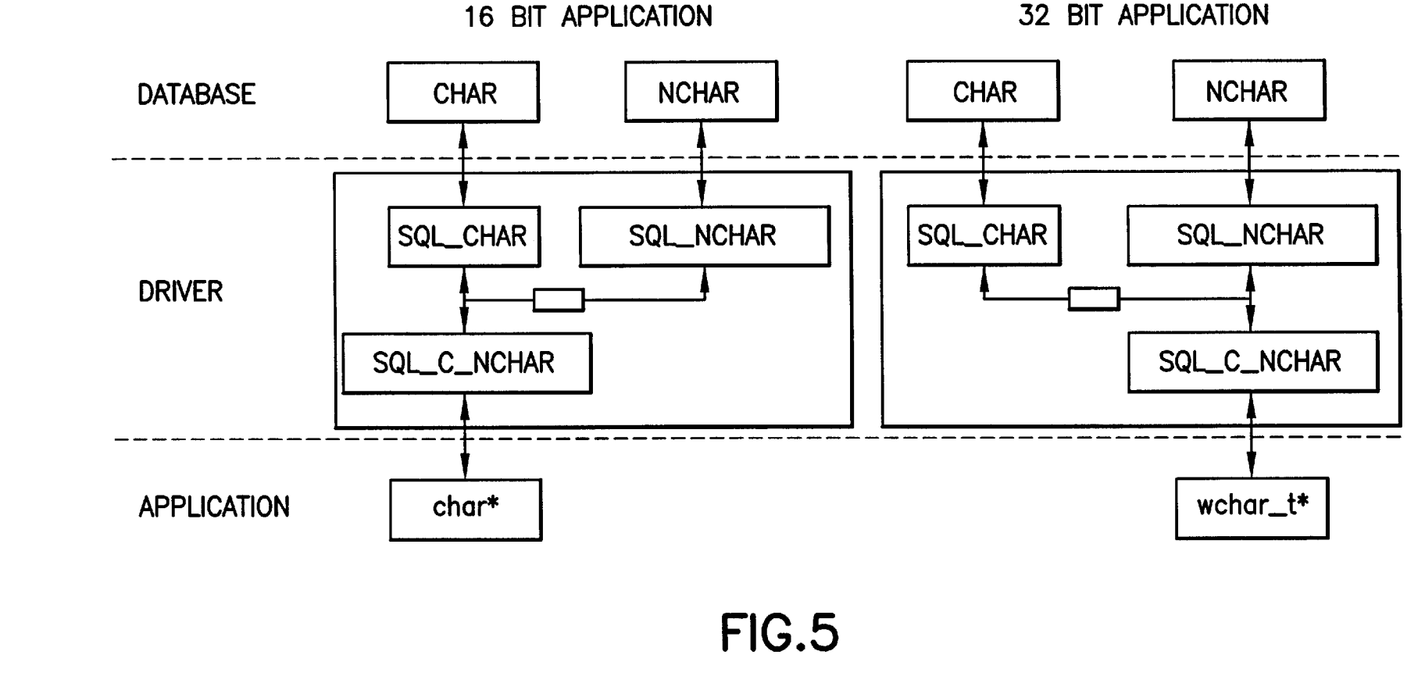
FIG. 5 is a diagram illustrating transformation of data types carried out at the CLI driver.

In the similar manner that syntax of SQL statements is distinguished as described above, exchanges of character data between the database and the application program via a variable (region) may be distinguished. This is illustrated in FIG. 5. Namely, the application accesses character string data using the conventional variable (region) as it is, without taking account of two or more character string types. In FIG. 5, this is shown with "char*" and "wchar t*". In accordance with this invention, required transformations of data types are performed in the driver as shown in FIG. 5, thereby to access the database.

Figure 6:
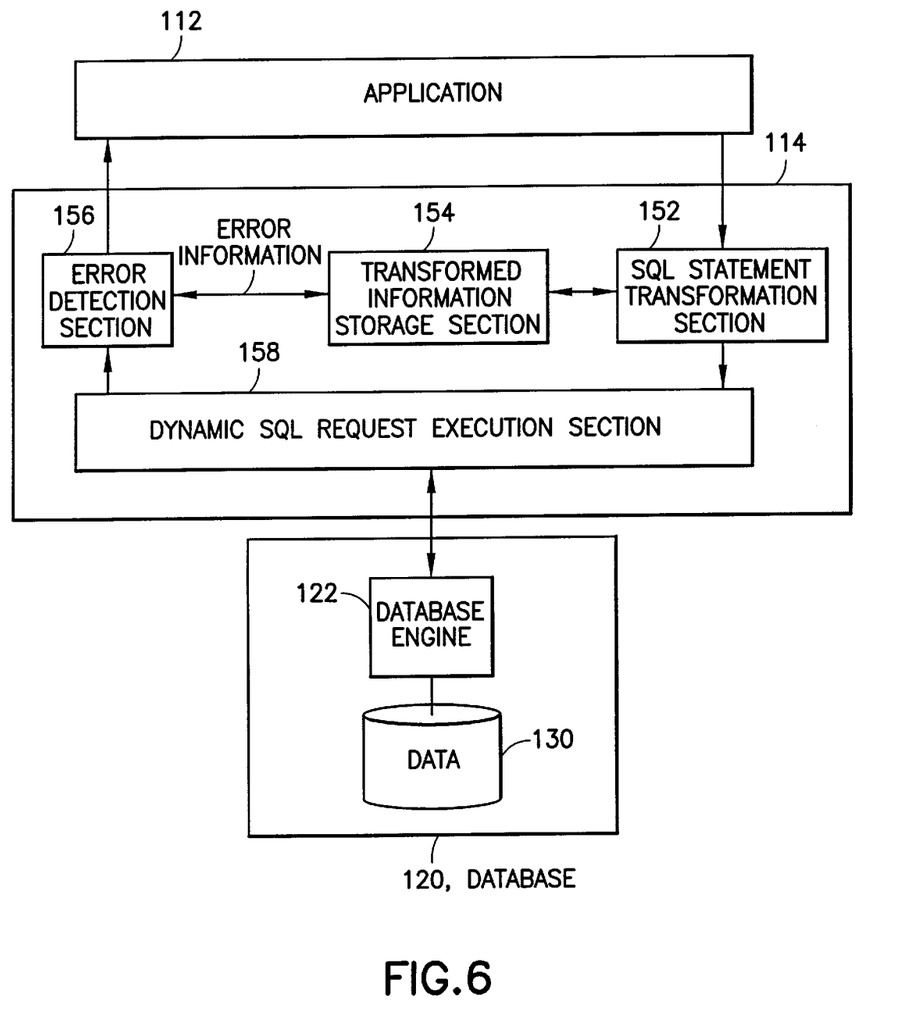
FIG. 6 is a functional block diagram illustrating another embodiment of syntax transformation.
Figure 7:
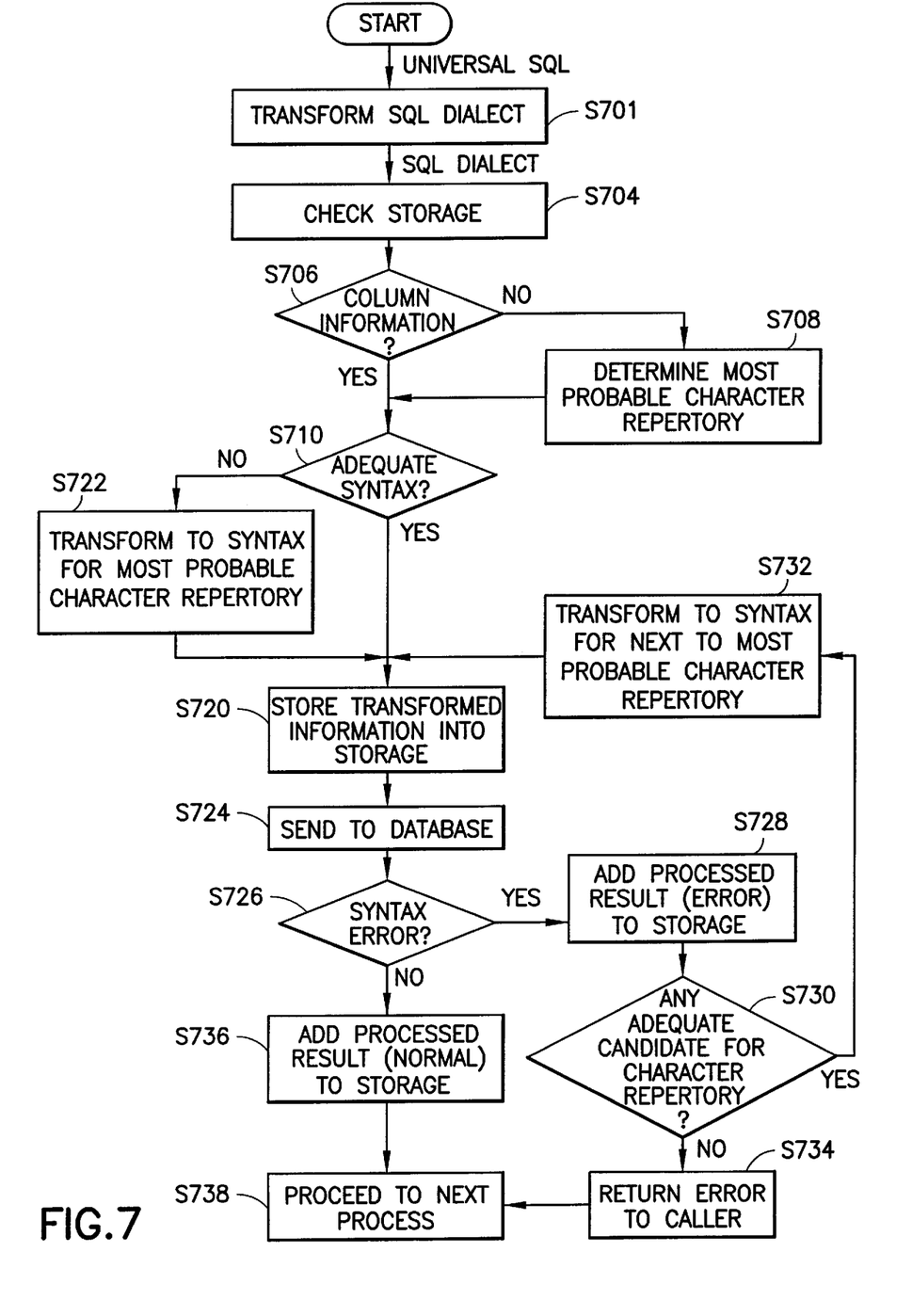
FIG. 7 is a flow chart illustrating another process for syntax transformation.

In another embodiment shown in FIGS. 6 and 7, a data type of a column that has been successfully accessed is stored in a CLI driver 114, and when re-access is requested, an SQL statement is modified based on the stored information, without doing any attempt from the outset. This is schematically illustrated in FIG. 6. First, an SQL statement from an application 112 used for accessing a database 120 is entered into the CLI driver 114. Then, at an SQL statement transforming section 152, content of a transformed information storage section 154 is checked to see if there is information of a column to be accessed. If so, this SQL statement is transformed by using such information of the column.

If there is no information in the transformed information storage section 154, the literal of this SQL statement is examined to transform it into another SQL statement that is supposed to be adequate, in the same manner as aforesaid process. The transformed SQL statement is then sent to a database engine 122 via a dynamic SQL request execution section 158 for executing it with respect to data 130.

The executed result is sent to an error detection section 156, thereby sending error information that indicates erroneous or normal to the transformed information storage section 154. This section 154 stores the processed result of the data type (erroneous or not) in association with the column to be accessed. The processed result is sent to application 112 as well.

FIG. 7 is a flow chart showing the process illustrated in FIG. 6 in more detail.

At CLI driver 114, a universal SQL statement in application 112 is transformed to an SQL dialect unique to the database 120 (S701). Data in the transformed information storage section 154 is checked (S704), thereby to examine if information of a column to be accessed is stored therein (S706). If so, such information is used to examine if syntax of the SQL statement is adequate for the character repertory (S710). If not adequate, it is transformed to adequate syntax (S722). After storing the transformed information of this SQL statement into storage section 154 (S720), database 120 is accessed using this SQL statement (S724). If it results in a syntax error (YES branch of S726), the processed result (error) is added to the storage section 154 (S728), an adequate candidate for character repertory is selected (S730), and the present SQL statement is transformed to an SQL statement associated with the selected character repertory (S732). If there is no candidate, error information is returned to CALLER or the application 112 (S734). Thereafter, this process will proceed to next one (S738).

If the accessed result is normal, its processed result (normal) is added to the storage section 154 (S736), and this process will proceed to a next one (S738). As described above, storing a processed result for each column, it becomes possible to carry out transformation to an adequate SQL statement, without requiring any trial and error.

As seen from the above, the CLI driver of this invention enables the concealment of a difference of access syntax due to character string types from the application side, and yet it does not require any change on the database side.

This invention may be applied to a system configured by interconnecting a plurality of computers. Likewise, it may be applied to a stand-alone device as well.

Further, with respect to a portion that executes its function by means of a program, such a portion may be implemented by storing its program on a recording medium and reading the program by a computer system. This recording medium may be a floppy disk, a CD-ROM, a magnetic tape, a ROM cassette or the like.

Advantages of the Invention

As described above, in accordance with this invention, there is no need to change an application or database even in a situation where a database system is extended to increase the number of data types to be accessed.

What is claimed is:

1. A database access system for interfacing database access from an application, comprising:

means for examining a literal of a database access statement of a first data type passed thereto;

means for transforming said database access statement to another database access statement of another data type adequate for said literal; and means for accessing a database using said another database access statement.

2. The database access system of claim 1, wherein if an accessed result is erroneous, said transforming means transforms said another database access statement again to yet another database access statement adequate for said literal, thereby to access said database.

3. The database access system of claim 2, wherein said transforming means repeats said transformation until transformation candidates are exhausted.

4. The database access system of claim 2, wherein said transforming means repeats said transformation until a specified number of transformation candidates are transformed.

5. The database access system of claim 2, further comprising:

transformation storage means for storing transformed information for each column, whereby said transforming means performs a first transformation based on the information stored in said transformation storage means.

6. A recording medium for storing a program adapted for implementing functions of an interface in a database access system, said program being executable to carry out machine-effected steps of: examining a literal of a database access statement of a first data type passed thereto;

transforming said database access statement to another database access statement of another data type adequate for said literal; and accessing a database using said another database access statement.

7. A database access system for interfacing database access from an application, comprising:

a) means for examining a literal of a database access statement passed thereto, said database access statement being in a form of an SQL statement of a character type;

b) means for transforming said database access statement to another database access statement adequate for said literal, said another database access statement being a character string type other than said character type;

c) means for accessing a database using said another database access statement; and d) means responsive to an error state resulting from use of said another database access statement, for causing said means for transforming to select a further database access statement adequate for said literal, and for operating said means for accessing to again access said database using said further database access statement.

8. The database access system of claim 7, wherein said means d) causes said transforming means to repeat said transformation until transformation candidates are exhausted.

9. The database access system of claim 7, wherein said means d) causes said transforming means to repeat said transformation until a specified number of transformation candidates are transformed.

10. The database access system of claim 7, wherein said another database access statement is a character string data type that is independently extendable by a user.

11. The database access system of claim 7, wherein said another database access statement is a character string type that requires a syntax different from that of a standard character string type used for accessing of data.

12. A recording medium for storing a program adapted for implementing functions of an interface in a database access system, said program being executable by a computer under control of said recording medium to carry out the steps of:

a) examining a literal of a database access statement passed thereto, said database access statement being in a form of an SQL statement of a character type;

b) transforming said database access statement to another database access statement adequate for said literal, said another database access statement being a character string type other than said character type;

c) accessing a database using said another database access statement; and d) responding to an error state resulting from use of said another database access statement, for causing step b) to select a further database access statement adequate for said literal, and for causing step c) to again access said database using said further database access statement.

13. The recording medium of claim 12, wherein said another database access statement is a character string data type that is independently extendable by a user.

14. The recording medium of claim 12, wherein said another database access statement is a character string type that requires a syntax different from that of a standard character string type used for accessing of data.

* * * * *